(12) United States Patent
Zhi et al.

(10) Patent No.: US 11,251,429 B2
(45) Date of Patent: Feb. 15, 2022

(54) RECHARGEABLE ELECTRICAL DEVICE HAVING A MULTI-LAYERED STRUCTURE MOLYBDENUM DISULPHIDE CATHODE

(71) Applicant: City University of Hong Kong, Kowloon (HK)

(72) Inventors: Chunyi Zhi, Shatin (HK); Hongfei Li, Kowloon (HK); Zijie Tang, Kowloon (HK); Zifeng Wang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 202 days.

(21) Appl. No.: 16/295,076

(22) Filed: Mar. 7, 2019

(65) Prior Publication Data

US 2020/0287217 A1  Sep. 10, 2020

(51) Int. Cl.
| | | |
|---|---|---|
| *H01M 4/58* | (2010.01) | |
| *H01M 4/66* | (2006.01) | |
| *H01M 4/38* | (2006.01) | |
| *H01M 10/0565* | (2010.01) | |
| *H01M 10/054* | (2010.01) | |
| *H01M 4/74* | (2006.01) | |

(52) U.S. Cl.
CPC .......... *H01M 4/5815* (2013.01); *H01M 4/38* (2013.01); *H01M 4/663* (2013.01); *H01M 4/747* (2013.01); *H01M 10/054* (2013.01); *H01M 10/0565* (2013.01); *H01M 2300/0025* (2013.01); *H01M 2300/0085* (2013.01); *H01M 2300/0091* (2013.01)

(58) Field of Classification Search
None
See application file for complete search history.

(56) References Cited

U.S. PATENT DOCUMENTS

| | | | |
|---|---|---|---|
| 4,091,178 A | 5/1978 | Kordesch | |
| 8,663,844 B2 | 3/2014 | Kang | |
| 2016/0301096 A1* | 10/2016 | Zhamu | H01M 10/0568 |
| 2017/0346129 A1* | 11/2017 | Stolyarov | H01G 11/40 |

OTHER PUBLICATIONS

Yuanchao Pang, et al, Few-layer MoS2 anchored at nitrogen-doped carbon ribbons for sodium-ion battery anodes with high rate performanceJournal of Materials Chemistry A pp. 17963-17972 DOI: 10.1039/c7ta05780f Jul. 2017 (Year: 2017).*

* cited by examiner

*Primary Examiner* — Maria Laios

(57) ABSTRACT

A system and method for a rechargeable electrical device includes an anode, a cathode, an electrolyte located between the anode and the cathode, and a housing retaining the anode, cathode and electrode, wherein the cathode comprises a molybdenum sulphide compound.

18 Claims, 13 Drawing Sheets

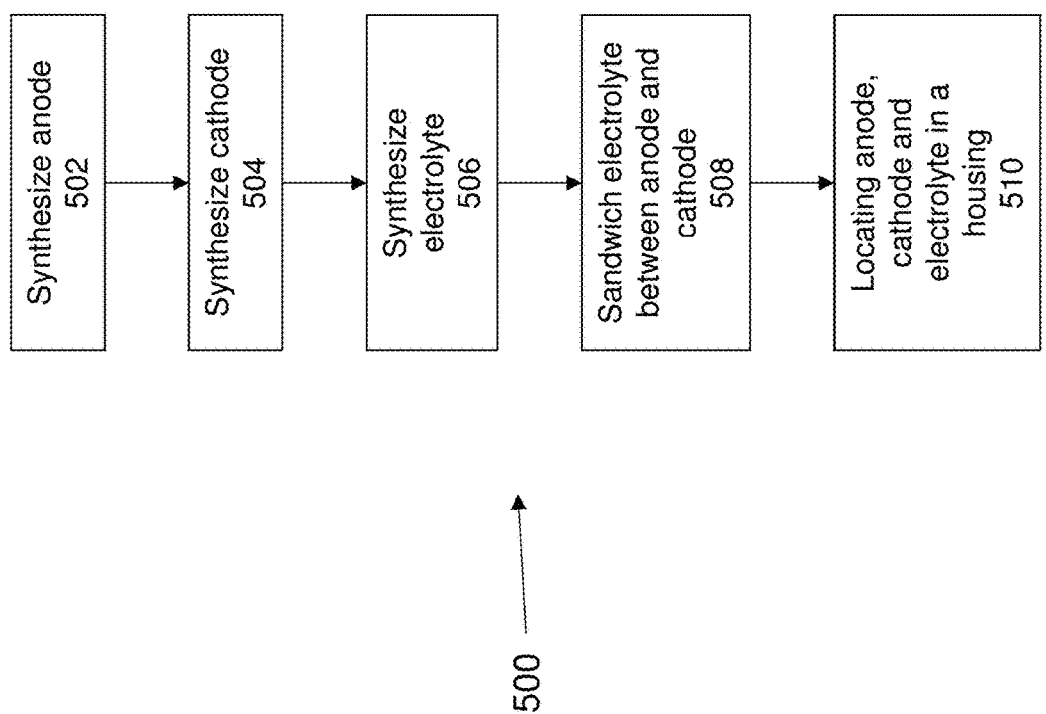

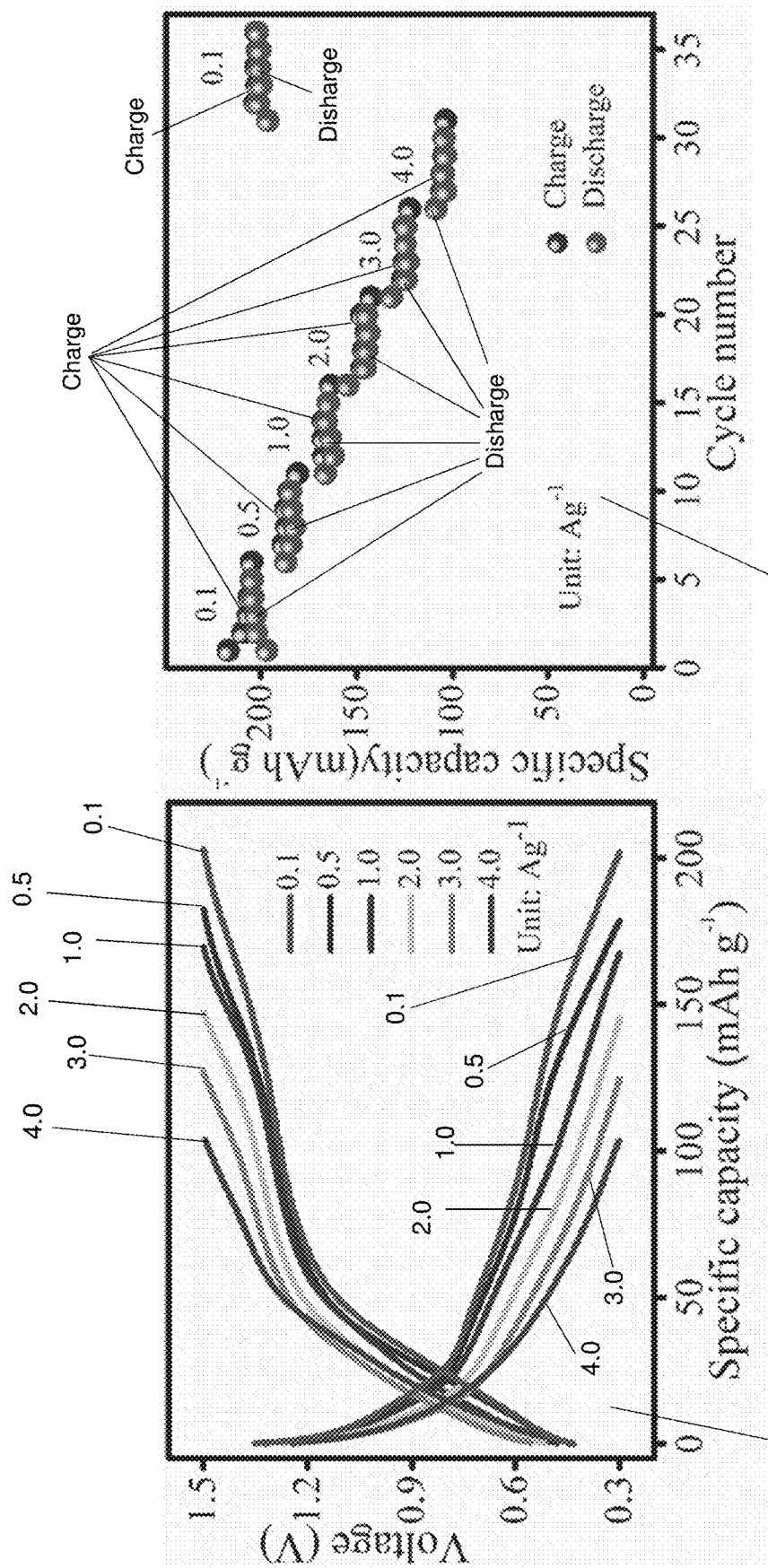

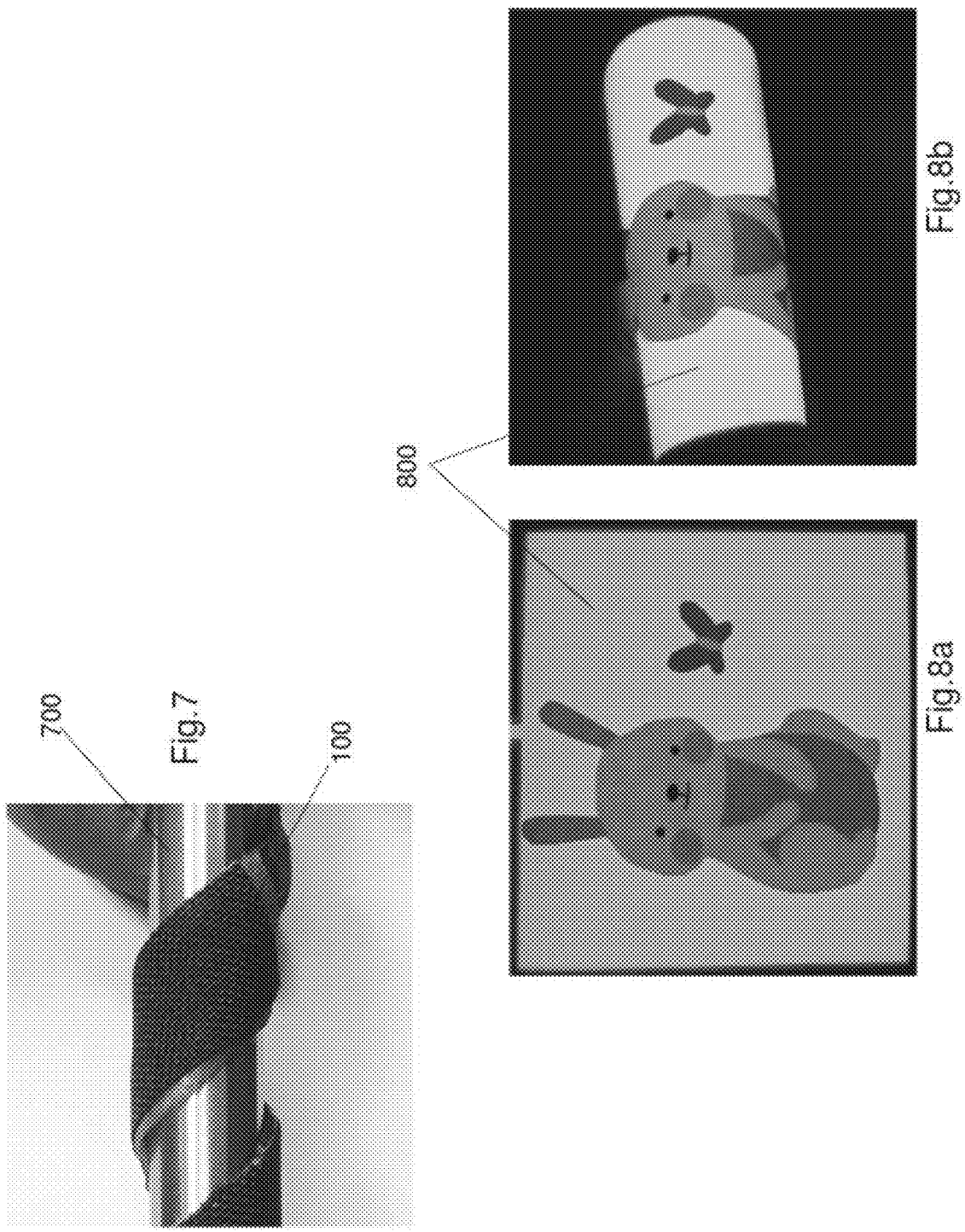

RECHARGEABLE ELECTRICAL DEVICE HAVING A MULTI-LAYERED STRUCTURE MOLYBDENUM DISULPHIDE CATHODE

TECHNICAL FIELD

The present invention relates to a rechargeable electrical device, in particular but not limited to, a rechargeable electrical energy supply device.

BACKGROUND

Electrical supply devices are common place in the modern world, and are used in a wide variety of different industries and applications. Batteries are one example of an electrical supply device that are commonly and widely used in various different applications. Batteries comprise a plurality of cells that are arranged in parallel or series. There is an increasing usage of electrical supply devices (e.g. batteries) in an increasing number of applications. Electrical supply devices are used as power supply devices in a multitude of products and applications.

Rechargeable batteries with low cost, high capacity and high safety are desired for a variety of applications such as for example in wearable devices or flexible electronics. Aqueous zinc ion batteries are type of battery that is increasing in usage. Zinc-ion batteries are used as rechargeable batteries. However very few cathode materials have been used. Some commonly used cathode materials are manganese based materials and vanadium based materials are commonly used in zinc ion batteries. However, many of these cathode materials show either poor cycling performance or limited specific capacity thereby limiting usage and/or lifespan of rechargeable zinc based batteries.

SUMMARY OF THE INVENTION

The present invention relates to a rechargeable electrical device that comprises an electrode comprising a molybdenum compound or at least provides a useful alternative.

The rechargeable electrical device in one example is a battery (or cell) that supplies electrical energy based on a chemical reaction. The electrical device exhibits improved cycling performance and an increased specific capacity. Alternatively, the rechargeable electrical device may be a capacitor or a super capacitor that can be continuously charged and discharged for several cycles with minimal performance deterioration.

In accordance with a first aspect the present disclosure relates to a rechargeable electrical device comprising:
an anode,
a cathode,
an electrolyte located between the anode and the cathode,
a housing retaining the anode, cathode and electrode, wherein the cathode comprises a molybdenum sulphide compound.

In an embodiment the cathode comprises molybdenum disulphide ($MoS_2$).

In an embodiment the cathode comprises a cathode substrate and molybdenum disulphide disposed on the cathode substrate.

In an embodiment the cathode substrate comprises a flexible carbon cloth, the carbon cloth comprises molybdenum disulphide attached to flexible carbon cloth.

In an embodiment the anode comprises a zinc or zinc compound.

In an embodiment the anode comprises an anode substrate and a zinc foil wherein the zinc foil is disposed on the anode substrate.

In an embodiment the anode substrate comprises a carbon cloth.

In an embodiment the cathode comprises a multi-layered structure of molybdenum disulphide.

In an embodiment the multi-layered structure comprises a plurality of molybdenum disulphide nanosheets vertically arranged on the carbon cloth.

In an embodiment the cathode multi-layered structure is configured for ion intercalation.

In an embodiment the cathode multi-layered structure is configured to store and release zinc ions during charging and discharging cycles of the electrical device.

In an embodiment the cathode comprises an interlayer spacing between each layer of molybdenum disulphide nanosheet is between 0.4 nm to 1 nm.

In an embodiment the interlayer spacing is around 0.7 nm.

In an embodiment the electrolyte comprises a hydrogel.

In an embodiment the hydrogel comprises starch and polyacrylamide.

In an embodiment the rechargeable electrical device is a battery.

In accordance with a further aspect, the present disclosure relates a rechargeable battery comprising:
an anode,
a cathode, wherein the anode and cathode being spaced apart from each other,
an electrolyte disposed between the anode and the cathode,
the anode comprises zinc or a zinc alloy,
the cathode comprising molybdenum disulphide,
the electrolyte comprising a hydrogel or a gel polymer, wherein the electrolyte functioning as a separator and an electrolyte.

In an embodiment the molybdenum disulphide cathode is configured to reversibly store and release zinc ions during charging and discharging processes respectively.

In an embodiment the cathode comprises a multi-layer structure, the multi-layered structure comprising a plurality of spaced molybdenum disulphide sheets arranged on a substrate, and wherein spaces between adjacent molybdenum disulphide sheets provide spaces for intercalation of zinc ions.

In an embodiment the interlayer spacing between adjacent sheets of molybdenum disulphide is between 0.6 nm and 0.8 nm.

In an embodiment the anode comprises zinc metal or a zinc alloy and the electrolyte comprises an electrolyte that includes starch and polyacrylamide.

In an embodiment the anode and cathode each comprise a substrate, the substrate comprises a carbon cloth, the anode comprises a zinc film disposed on the carbon cloth and the cathode comprises molybdenum disulphide powder disposed on the carbon cloth.

In an embodiment the electrical device comprises a current collector disposed on the cathode and a current collector disposed on the anode, each current collector comprising a plate disposed on the anode and cathode respectively.

In accordance with a further aspect, the present disclosure relates to a method fabricating a rechargeable electrical device, the method comprising the steps of:
synthesizing an anode,
synthesizing a cathode,
forming a hydrogel or polymer gel electrolyte, sandwiching the electrolyte between the anode and the cathode, locating the anode, cathode and electrolyte within a housing, wherein the cathode comprises a molybdenum compound.

In an embodiment molybdenum compound is configured to reversibly store and release zinc ions during charging and discharging processes respectively.

In an embodiment the molybdenum compound is molybdenum disulphide.

In an embodiment the step of synthesizing an anode comprises the additional steps of:

providing a pre-treated carbon cloth as an anode substrate, electrodepositing a zinc foil on the carbon cloth.

In an embodiment the step of synthesizing the cathode comprises the additional steps of:

providing a carbon cloth,
immersing the carbon cloth into nitric acid,
washing the carbon cloth,
dissolving $Na_2MoO_4$ and $CS(NH_2)_2$ and glucose to create a solution,
adding hydrochloric acid to the solution,
immersing the carbon cloth into the solution,
stirring the carbon cloth and solution for a predetermined time,
autoclaving the solution and the carbon cloth at a predetermined temperature for a predetermined time.

In an embodiment the step of synthesizing the electrolyte comprises the additional steps of:

mixing starch and deionised water,
stirring the starch and water mixture at a predetermined temperature above room temperature for a predetermined time,
cooling the stirred mixture to room temperature,
sequentially adding electrolyte monomers to the stirred mixture,
stirring the mixture with the electrolyte monomers for an additional predetermined time,
injecting the stirred mixture into moulds,
heating the moulds at a predetermined temperature for a predefined time period to create a hydrogel,
immersing the hydrogel into a M aqueous $ZnSO_4$ solution.

In an embodiment the electrolyte monomers comprise acrylamide monomers, $K_2S_2O_8$ and N,N'-methylenebisacrylamide.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

As used herein the term battery means an electrical component that provides electrical energy (i.e. power) by converting one form of energy to electrical energy. The term battery, as used herein is meant to cover a cell and/or battery.

As used herein the term nanosheet means a sheet that is in the nanometre size range i.e. the dimensions of the sheet are in nanometres.

As used herein the term 'and/or' means 'and' or 'or', or where the context allows both.

The invention consists in the foregoing and also envisages constructions of which the following gives examples only. In the following description like numbers denote like features.

As used herein "(s)" following a noun means the plural and/or singular forms of the noun.

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that at least some embodiments may be described as a method (i.e. process) that is depicted as a flowchart, a flow diagram, a structure diagram, or a block diagram. Although a flowchart may describe the operations as a sequential method, many of the operations can be performed in parallel or concurrently. In addition, the order of the operations may be rearranged. A method (i.e. process) is terminated when its operations are completed.

In this specification, the word "comprising" and its variations, such as "comprises", has its usual meaning in accordance with International patent practice. That is, the word does not preclude additional or unrecited elements, substances or method steps, in addition to those specifically recited. Thus, the described apparatus, substance or method may have other elements, substances or steps in various embodiments. The term "comprising" (and its grammatical variations) as used herein are used in the inclusive sense of "having" or "including" and not in the sense of "consisting only of".

The invention (or inventions) as described herein may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

Notwithstanding any other forms which may fall within the scope of the present disclosure, a preferred embodiment will now be described, by way of example only, with reference to the accompanying drawings in which:

FIG. 5a shows a method of fabricating the rechargeable electrical device.

FIG. 5b shows a method of synthesizing an anode that forms part of the method of FIG. 5a.

FIG. 5c shows a method of synthesizing a cathode that forms part of the method of FIG. 5a.

FIG. 5d shows a method of synthesizing an electrolyte that forms part of the method of FIG. 5a.

FIG. 6a shows galvanostatic charge/discharge curves of the rechargeable electrical device of FIG. 1, at various current densities.

FIG. 6b shows rate performance graph of the electrical device of FIG. 1.

FIG. 7 shows a photo of the rechargeable electrical device that is wrapped around a stainless steel bar.

FIGS. 8a and 8b illustrate a flexible electroluminescent panel that is powered by three batteries having a construction similar to the electrical device of FIG. 1.

DETAILED DESCRIPTION OF THE PREFERRED EMBODIMENT

Figure 1:
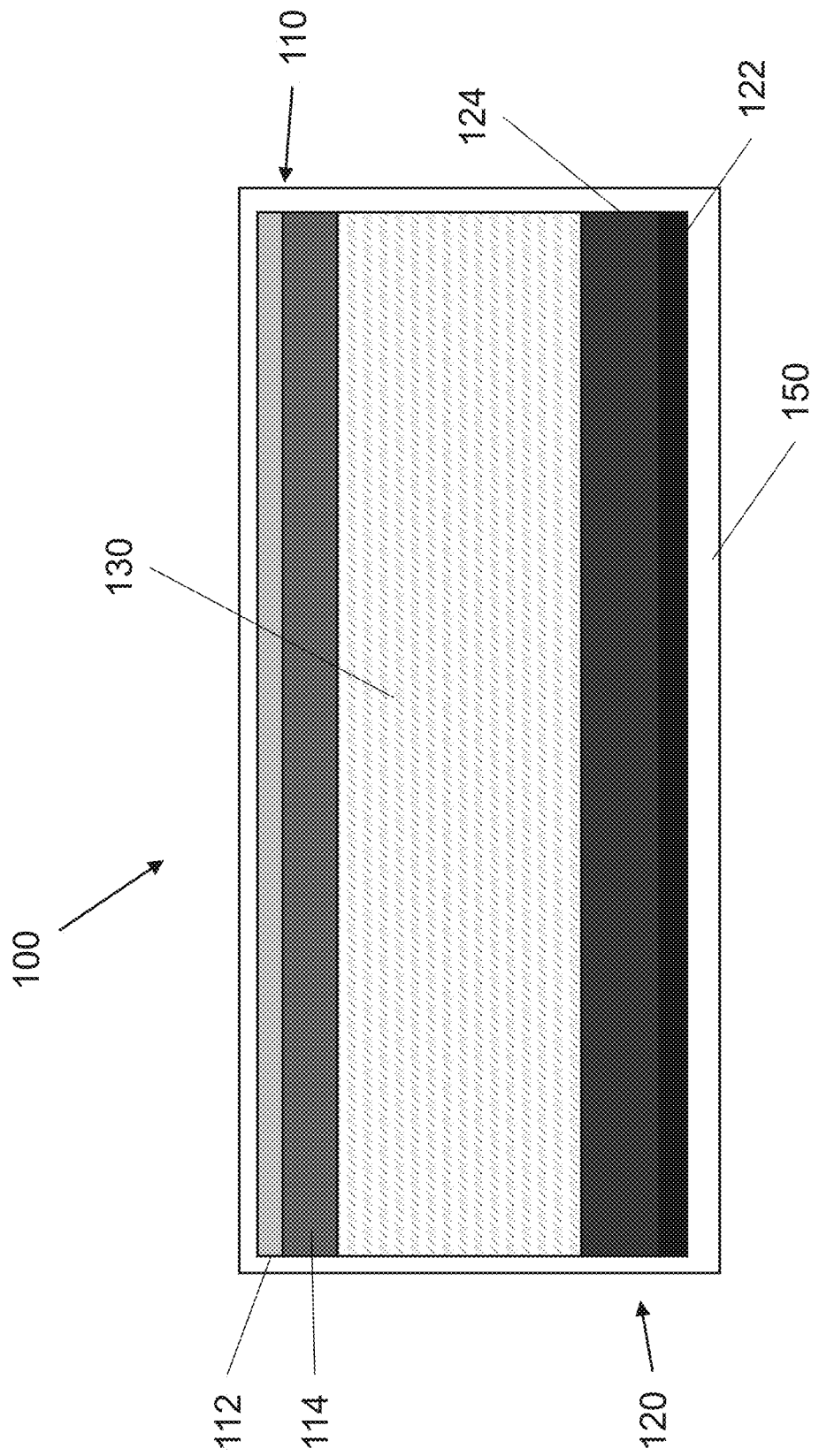
FIG. 1 is an embodiment of a rechargeable electrical device.

Electrical supply devices are common place in the modern world, and are used in a wide variety of different industries and applications. Batteries are one example of an electrical supply device that are commonly and widely used in various different applications. Batteries comprise a plurality of cells that are arranged in parallel or series. There is an increasing usage of electrical supply devices (e.g. batteries) in an increasing number of applications. Electrical supply devices are used as power supply devices in a multitude of products and applications.

Rechargeable batteries with low cost, high capacity and high safety are desired for a variety of applications such as for example in wearable devices or flexible electronics. Rechargeable batteries with low cost, high capacity and high safety are highly desired for next generation grid-scale applications and flexible electronics. Among various electrical energy supply devices, lithium ion batteries have been widely investigated and are most commonly used since they possess higher energy density compared to other types of batteries. Lithium ion batteries have intrinsic safety issues and the availability and price of lithium is causing the price of Lithium ion batteries to rise. Other rechargeable multi-valent ion batteries based on Zinc ions, Magnesium ions or Aluminium ions are useful alternatives to Lithium ion batteries due to reduced costs and improved intrinsic safety.

Among these alternative batteries aqueous rechargeable Zinc ion batteries (ZIB) are the most commonly used alternative and are increasing in popularity. This is due to the high abundance, low price, high specific capacities, highly reversible dissolution and deposition in neutral electrolytes containing $Zn^{2+}$, relatively low oxidation-reduction potential and stability in water. However very few cathode materials have been explored and very cathode materials are useable to provide a suitable rechargeable electrical device (e.g. a rechargeable battery). Some commonly used cathode materials are Manganese oxide compounds, Copper compounds and Vanadium compounds. These commonly used cathode materials show poor cycling performance or limited specific capacity.

The present disclosure relates to a rechargeable electrical device that is configured to supply electrical energy to a component or circuit connected to the electrical device. The rechargeable electrical device in one example is a rechargeable battery.

The present disclosure is directed to a rechargeable electrical device that comprises an electrode comprising a molybdenum compound. The rechargeable electrical device is a rechargeable battery that can provide electrical energy.

In an embodiment the rechargeable electrical device (i.e. battery) comprises an anode, a cathode, and an electrolyte. The cathode comprises a molybdenum compound, in particular a molybdenum sulphide compound. In one configuration the cathode comprises molybdenum disulphide disposed on a substrate. The molybdenum disulphide ($MoS_2$) assists in improved charging and discharging, provides the battery with a significant specific capacity and has substantial cyclic stability.

In a further embodiment the rechargeable electrical supply device comprises an anode, a cathode and an electrolyte located between the anode and cathode. The cathode comprises a compound that provides a structure for intercalation of positive ions. The cathode comprises a multi-layer structure, wherein the inter layer spaces provide intercalation sites. One example material that comprises a multi-layer structure is molybdenum disulphide. The cathode comprises a substrate with molybdenum disulphide disposed on the substrate. The molybdenum disulphide ($MoS_2$) material undergoes intercalation/deintercalation of positive metal ions from the anode e.g. $Zn^{2+}$ during charging and discharging cycles. The molybdenum disulphide provides an increased (i.e. expanded) inter-layer spacing that reduces ion diffusion resistance and leads to faster reaction kinetics, providing a more efficient charging and discharging of the electrical device.

The rechargeable electrical device as described herein delivers a specific capacity of approximately $200 \text{ mA h g}^{-1}$ at $0.1 \text{ Ag}^{-1}$. In one example the molybdenum disulphide electrode provides $202 \text{ mA h g}^{-1}$ at $0.1 \text{ Ag}^{-1}$. The electrical device also provides an energy density of around $148 \text{ Wh kg}^{-1}$ and good cycle stability with a capacity retention ratio of over 95% across at least 600 cycles. The rechargeable electrical device as described herein is a flexible device (i.e. a flexible battery) that can be bent, twisted, stretched and compressed. The rechargeable electrical device as described herein maintains electrochemical performance (or at least exhibits decent electrochemical performance) under various heavy deformations.

Figure 2:
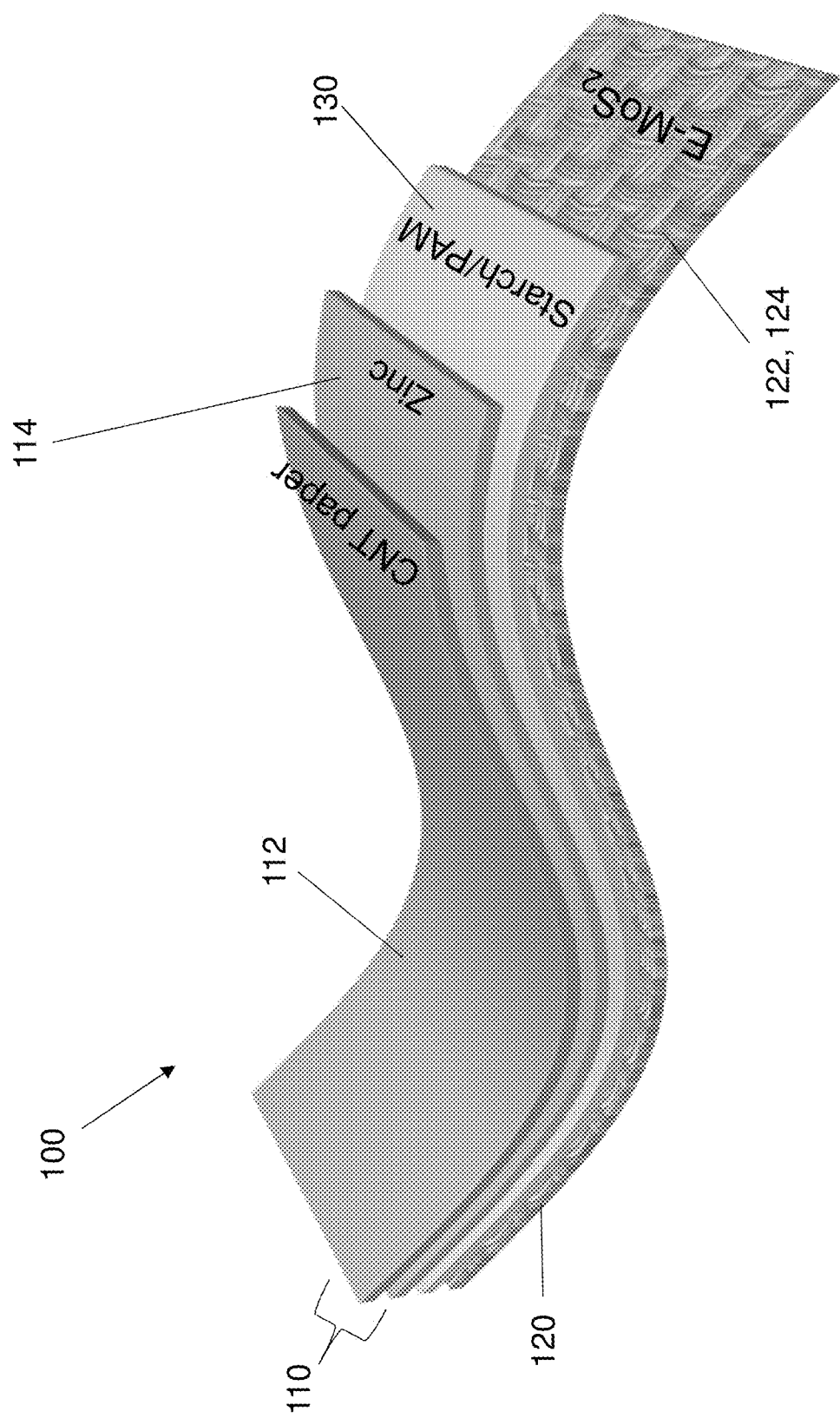
FIG. 2 shows an example configuration of the rechargeable electrical device of FIG. 1, in the form of a flexible battery.

FIGS. 1 and 2 show an example embodiment of a rechargeable electrical device 100. The illustrated rechargeable electrical device 100 is a rechargeable battery 100. The device 100 comprises an anode 110, a cathode 120 and an electrolyte 130. The anode 110 and cathode 120 are spaced apart from each other with a gap defined between the anode 110 and the cathode 120. The electrolyte 130 is sandwiched between the anode 110 and cathode 120. The rechargeable electrical device 100 (i.e. rechargeable battery) comprises a housing 150 that contains and holds the anode 110, cathode 120 and the electrolyte 130.

The anode 110 comprises an anode substrate 112 and a metal layer 114. The metal layer 114 contributes positive metal ions during an electrochemical reaction within the battery that provides electrical energy. The metal layer 114 comprises zinc. The zinc 114 may be a zinc film or zinc foil.

Preferably zinc is used as the anode material because of its low cost, high specific capacity, highly reversible dissolution, abundance in nature, stability in water/aqueous solutions and relatively low oxidation-reduction potential e.g. −0.763V as compared to a standard hydrogen electrode.

The anode substrate 112 in the example embodiment is a carbon cloth. The carbon cloth may be pre-treated carbon cloth e.g. an acid cleaned or acid treated carbon cloth to improve attachment of the zinc onto the carbon cloth. The carbon cloth of the anode substrate 112 may be formed from a plurality of carbon fibres (i.e. carbon strands) by weaving or another suitable process. The use of a carbon cloth as an anode substrate makes the anode flexible and capable of large deformations e.g. twisting, bending, stretching and compressing. The carbon cloth is conductive or may include conductive additives that are part of the carbon cloth such that the carbon cloth is electrically conductive.

The electrolyte 130 is a hydrogel electrolyte. Alternatively, the electrolyte 130 may comprise a polymer gel. The electrolyte 130 comprises a hydrogel that includes a polymer and starch. In the illustrated embodiment the electrolyte polymer comprises a polyacrylamide material. The polyacrylamide grafted onto starch chains to form the hydrogel electrolyte. The electrolyte may also comprise an aqueous solution of zinc sulphate. The electrolyte 130 is in the form of a flexible hydrogel that can be flexed or deformed without breaking and without compromising electrochemical performance.

The cathode 120 comprises a cathode substrate 122 and a cathode material 124 disposed on the cathode substrate 122. In the illustrated embodiment the cathode substrate 122 comprises a flexible carbon cloth. The cathode material 124 comprises a molybdenum compound. Preferably the cathode material 124 comprises a molybdenum sulphide compound. In the illustrated embodiment the cathode material 124 comprises molybdenum disulphide ($MoS_2$). The molybdenum disulphide material is attached to and positioned on the carbon cloth 122. The carbon cloth 122 comprises a woven cloth containing a plurality of carbon strands that are woven together. The molybdenum disulphide may be in the form of a powder that coats each carbon strand.

The anode 110 and cathode 120 are rectangular shaped as shown in FIG. 1 and FIG. 2. The anode 110 and cathode 120 may be any other polygon shape or may be circular or elliptical. The shape of the anode 110 and cathode 120 are selected based on the specific application of the battery 100.

The components of the battery 100 are arranged in a stacked arrangement as shown in FIGS. 1 and 2. The electrolyte 130 is sandwiched between the anode 110 and the cathode 120. The electrolyte 130 electrically couples the anode 110 and the cathode 120. The anode 110 and cathode 120 are each in contact with the electrolyte 130. The anode 110 and the cathode 120 are coupled to the electrolyte 130 due to the surface tackiness of the hydrogel electrolyte 130 or may be pressed together as part of the battery 100 fabrication process. Alternatively, an adhesive may be used to connect the anode 110 and cathode 120 to the electrolyte 130.

The battery 100 also further comprises a housing 150, as shown in FIG. 1. The housing contains the components of the battery 100 (i.e. the anode, cathode and the electrolyte). The housing 150 is formed from a strong, tough and inert material. The housing material is also substantially electrically insulating and thermally insulating. The housing 150 comprises a material that is substantially mechanically robust. The housing 150 may be made from a plastics material such as for example a polyurethane.

The battery 100 may comprise an additional separator that is located between the anode 110 and the cathode 120. In the illustrated embodiment starch and polyacrylamide hydrogel electrolyte 130 functions as the separator and electrolyte.

The battery 100 may optionally comprise a current collector disposed on the cathode. The current collector may be any polygon shaped element. The anode may also comprise a current collector. The current collectors function as pins that another electrical component or electrical circuit can connect to. The current collector of the cathode is made of a different material to the current collector of the anode. In current collector may be incorporated into the anode substrate 114 and the cathode substrate 122 respectively.

FIG. 2 shows an exploded view of the battery 100. FIG. 2 shows the flexibility of the battery 100. The battery 100 is flexed to form an undulating shape i.e. a wave shape with a bend within it. The battery 100 is a flexible battery that can be deformed and returned to its original shape. The battery 100 may also be resilient such that the battery can deform under a force and return to its original shape once the force is removed. As shown in FIG. 2 the cathode 120 comprises an integrated structure of the cathode substrate 122 and the cathode material 124. The cathode 120 does not have two separate visible layers, but includes an integrated structure of carbon cloth with molybdenum disulphide particles deposited on and integrated with the carbon cloth.

The molybdenum disulphide material forms a layered structure. Molybdenum disulphide ($MoS_2$) on the cathode comprises a multi-layer structure that comprises a plurality of layers of molybdenum disulphide. The layers are spaced apart from each other and are bonded by weak van der Waals forces. The molybdenum disulphide comprises a plurality of nanosheets (i.e. Nano scale sheets) that are arranged on the carbon fibre cloth 122. The nanosheets of molybdenum disulphide are vertically arranged on the carbon fibre cloth 122. The nanosheets are aligned on the surface of the carbon fibres forming a 3D heterostructured architecture. The cathode 120 comprises a three dimensional open network architecture of a carbon cloth and molybdenum disulphide composite. The nanosheets define the layers of the molybdenum disulphide 124 and carbon cloth 122 cathode 120. The inter-layer spacing provides space to receive and hold ions e.g. positively charged $Zn^{2+}$ ions.

Figure 3:
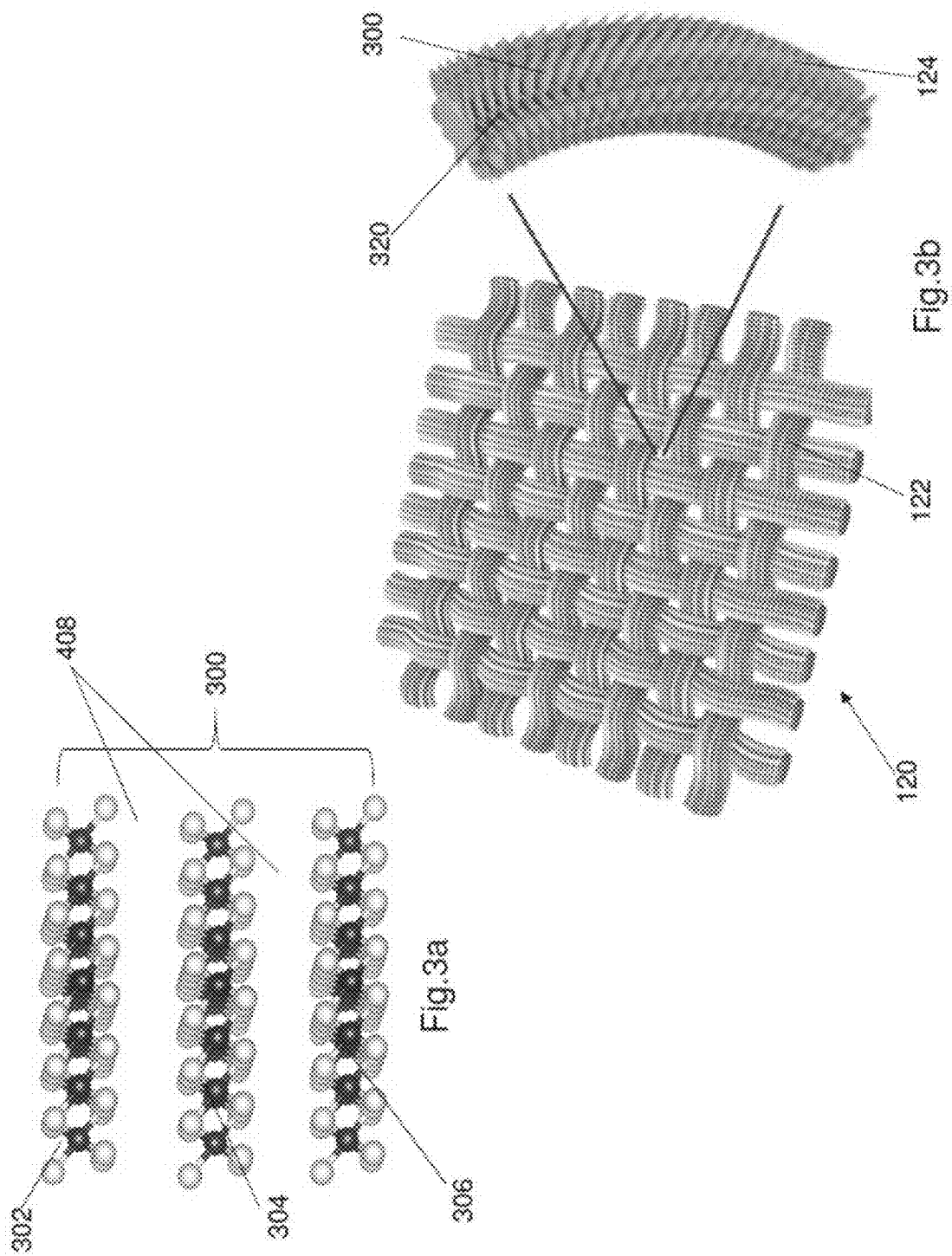
FIG. 3a shows an example of the multi-layer structure of cathode of the rechargeable electrical device.
FIG. 3b shows a view of the molybdenum disulphide multi-layer structure formed on each strand of the carbon cloth of the cathode.
Figure 4:
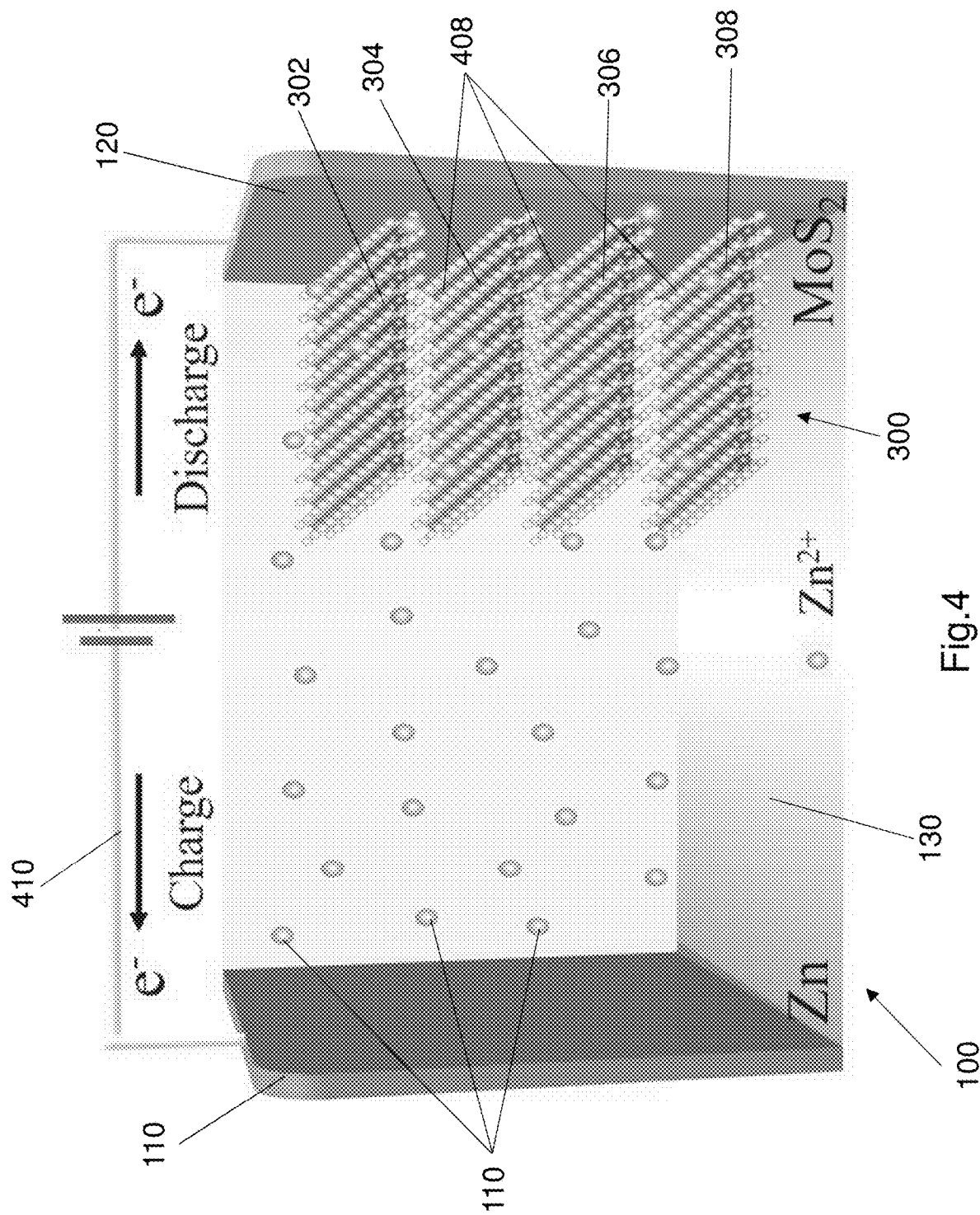
FIG. 4 illustrates a mechanism of operation of the rechargeable electrical device.

The molybdenum disulphide provides a multi-layer structure 300 with an expanded interlayer distances (i.e. expanded interlayer spacing). The molybdenum disulphide sheets are arranged in a lattice i.e. the multi-layer structure is formed as a lattice. FIG. 3a shows an illustration of the interlayer spacing. FIG. 4 shows an example of the multi-layer structure defining a lattice of molybdenum disulphide nanosheets. FIG. 3a shows three layers 302, 304, 306 of the molybdenum disulphide. Each layer 302, 304, 306 is defined by a nanosheet of molybdenum disulphide. The interlayer spacing 408 is between 0.4 nm to 1 nm. Preferably the interlayer spacing is between 0.6 nm and 1 nm. As shown in FIG. 3a the interlayer spacing between two adjacent nanosheets is 0.7 nm. The increased interlayer spacing and the van der Waals forces holding the layers together make the molybdenum disulphide material useful for as a host for ion intercalation.

FIG. 3b shows a view of a single strand of the carbon cloth comprising molybdenum disulphide multi-layer structure 300 formed on the strand 320. Each strand comprises a multi-layer molybdenum disulphide ($MoS_2$) structure formed thereon such that the cathode comprises an integrated carbon cloth and molybdenum disulphide ($MoS_2$) electrode.

FIG. 4 shows an illustration of the mechanism of the battery 100. FIG. 4 illustrates the anode 110, cathode 120 and a circuit 410 connected between the anode and cathode. The circuit can be used for charging and discharging the battery 100. FIG. 4 shows the movement of ions during charging and discharging processes. The electrochemical reaction reactions between the Zn anode and the carbon cloth molybdenum disulphide cathode can be defined as:

Cathode: $xZn^{2+} + x2e^- + MoS_2 \leftrightarrow Zn_xMoS_2$

Anode: $xZn + x2e^- \leftrightarrow xZn$

In the above reaction x represents the amount of $Zn^{2+}$ ions that are intercalated in the molybdenum disulphide lattice. As seen from FIG. 4 during the discharge cycle $Zn^{2+}$ ions 402 moved from the Zn anode 110 to the cathode 120 i.e. more specifically into the multi-layer structure 300 of the $MoS_2$. As seen in FIG. 4 during the discharge cycle the $Zn^{2+}$ ions 402 are intercalated into the $MoS_2$ lattice 300. The $Zn^{2+}$ ions are held within the interlayer spaces 408. The interlayer spaces are defined between adjacent $MoS_2$ sheets 302, 304, 306, 308. As seen in FIG. 4 the $Zn^{2+}$ ions 402 move into and are held between adjacent $MoS_2$ sheets 302, 304, 306 and 308. The cathode 120 comprises a plurality of $MoS_2$ arranged in a vertically stacked arrangement. During the charging cycle the Zn ions move out of the $MoS_2$ lattice back to the Zn anode 110.

As explained earlier the cathode 120 comprises a three dimensional open network architecture of a carbon cloth and molybdenum disulphide composite. The three dimensional open network architecture is defined by the multi-layer lattice defined by vertically aligned sheets. The structure of the cathode 120 improves interfacial contact between the cathode and the electrolyte, thereby shortening the $Zn^{2+}$ diffusion pathways. The enlarged interlayer spacing 408 between adjacent $MoS_2$ reduces ion diffusion resistance and leads to faster reaction kinetics and low energy barrier for $Zn^{2+}$ ion intercalation.

The carbon and molybdenum disulphide structure of cathode also provides an excellent conducting network thereby allowing current to flow. The enlarged interlayer spacing also allows the electrolyte 130 to infiltrate the carbon cloth and molybdenum disulphide structure improving electrical coupling between the cathode and the electrolyte. The molybdenum disulphide lattice is pliable on a nanoscale i.e. the sheets 302-308 can move away from each other during the $Zn^{2+}$ intercalation process, such that the interlayer spacing can increase from 0.7 nm to 0.73 nm when $Zn^{2+}$ are received between the layers.

The interlayer spacing of the $MoS_2$ sheets is advantageous because it reduces the amount of energy needed to move the sheets (i.e. layers) further apart as part of receiving the $Zn^{2+}$ ions thereby making the battery more efficient and capable of rapid charging and discharging. The increased interlayer spacing the reduced ion diffusion resistance can also provide a larger charge being produced by the battery 100.

The increased interlayer spacing of molybdenum disulphide nanosheets makes the electrochemical reaction more efficient. The reduced diffusion resistance and the lower energy barrier improves reaction kinetics. The battery 100 as described has improved charging/discharging of the battery due to the reduced diffusion resistance and lower energy barrier for intercalation. The $MoS_2$ based battery provides an improved and more efficient battery as compared to cathodes of other materials such as for example vanadium or manganese.

Fabrication of the battery 100 will now be described. FIG. 5a shows an example method 500 of fabricating the rechargeable electrical device 100. FIG. 5a shows a flow chart for a method of fabricating the rechargeable electrical device 100 (i.e. the rechargeable battery 100). The method 500 commences at step 502. Step 502 comprises synthesizing an anode. Step 504 comprises synthesizing a cathode. The cathode comprises a molybdenum compound. Step 506 comprises forming a hydrogel or polymer gel electrolyte. Step 508 comprises sandwiching the electrolyte between the anode and the cathode. Step 510 comprises locating the anode, cathode and electrolyte within a housing. Steps 502, 504 and 506 may be executed sequentially or concurrently with each other. Steps 502 to 506 can be executed in any order. Preferably the cathode comprises molybdenum disulphide disposed on a cathode substrate. The anode comprises zinc disposed on an anode substrate, e.g. a zinc film or zinc Steps 502, 504 and 506 comprise additional sub steps that define a method for synthesising the anode, synthesising the cathode and synthesising the electrolyte. FIG. 5b shows an example method 520 of synthesizing an anode 110 of the battery 100. The method 520 comprises a plurality of steps and commences with step 521. Step 521 comprises providing a pre-treated carbon cloth. The carbon cloth may be pre-treated by an acid. The carbon cloth functions as the anode substrate 112. The method progresses to step 522. Step 522 comprises electrodepositing a zinc foil onto the carbon cloth. The electrodeposition is conducted at 8 mA $cm^{-2}$ for 40 min on an electrochemical workstation. The carbon cloth comprising the electrodeposited zinc foil may be dried or heated such that the zinc coating is improved. Step 502 comprises the additional steps 521 and 522 as described above.

Figure 5C:
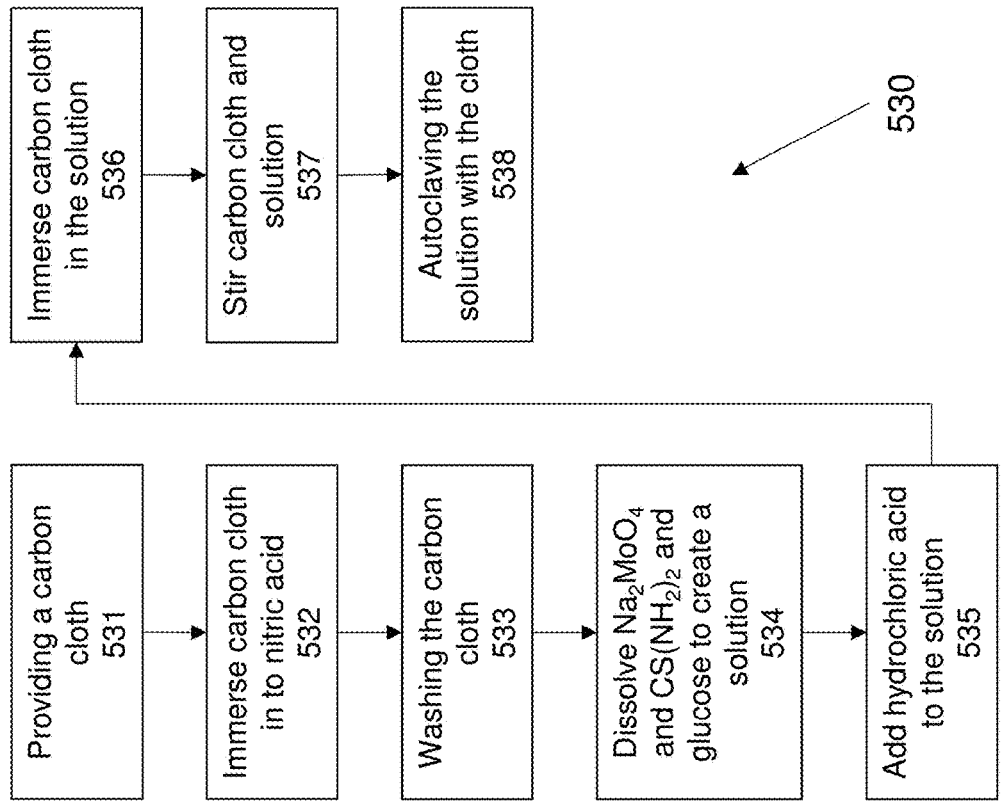
Figure 5B:
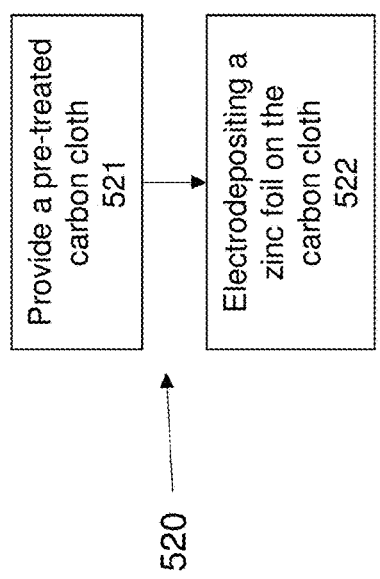

FIG. 5c shows a method 530 of synthesizing a cathode 120 of battery 100. The cathode is synthesized using a glucose assisted hydrothermal approach. The method 530 commences at step 531. Step 531 comprises providing a carbon cloth that acts as the cathode substrate. Step 532 comprises immersing the carbon cloth in a nitric acid for 10 hours at 60° C. One example of carbon cloth is a commercially available carbon cloth supplied by Shenzen Senke Corp, China. Step 533 comprises washing the carbon cloth with deionised water to remove nitric acid. Step 533 is performed on carbon cloth after it is removed from the nitric acid after immersion. Step 534 comprises dissolving $Na_2MoO_4$ and $CS(NH_2)_2$ and glucose in deionised water. In this example 0.25 g of $Na_2MoO_4$, 0.5 g of $CS(NH_2)_2$ and 0.16 g of glucose were dissolved in 70 ml of deionized water. Step 535 comprises adding several drops of concentrated HCl (hydrochloric acid) slowly into the solution until its pH value is adjusted to 1. Step 536 comprises immersing the carbon cloth into the solution. Step 537 comprises stirring for 10 min the solution and the carbon cloth. Step 538 comprises autoclaving the solution and carbon cloth. Step 538 comprises placing the solution and carbon cloth into an autoclave e.g. a Teflon line autoclave for 24 hours at 190°. Autoclaving for 24 hours at 190° results in the large sized freestanding cathode. This process results in the molybdenum sulphide binding to the carbon strands and forming a multi-layer structure. Step 504 from method 500 comprises all the steps of method 530. The steps of method 530 are executed as part of method 500 to synthesize the cathode 120.

Figure 5D:
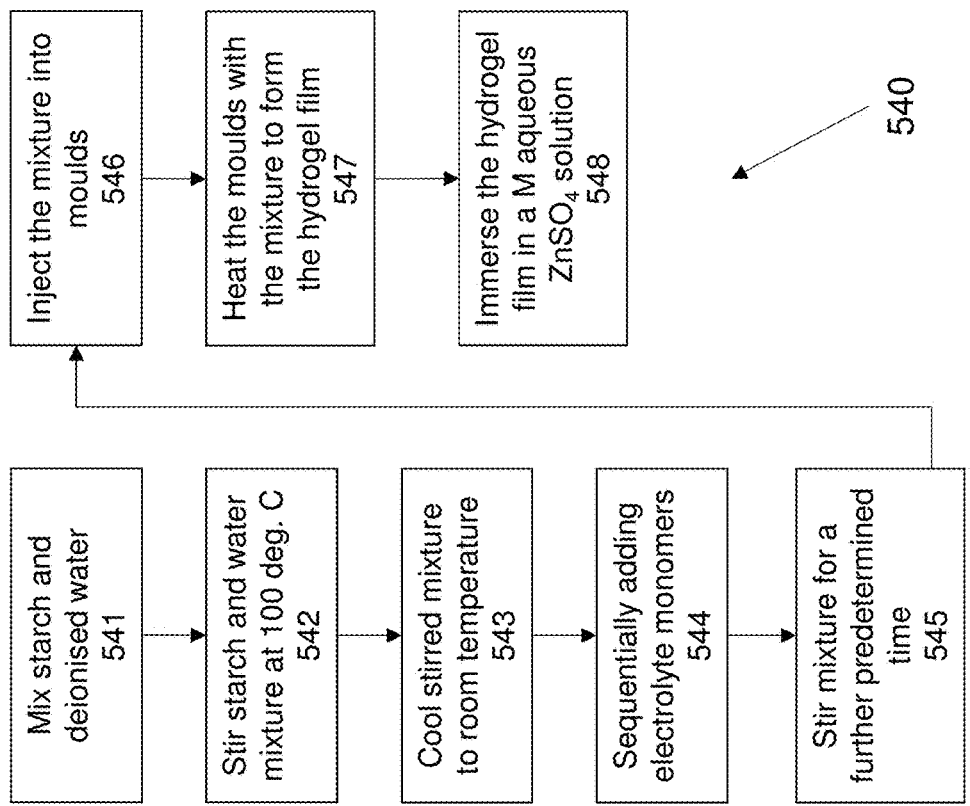

FIG. 5d shows a method 540 of synthesizing the electrolyte 130. The electrolyte is a starch and polyacrylamide hydrogel electrolyte. The method 540 commences at step 541. Step 541 comprises adding 3 g of starch (e.g. AR grade Aladdin starch) to 30 ml of deionized water. Step 542 comprises vigorously stirring the starch and water mixture for 50 mins at 100° C. Step 543 comprises cooling the stirred mixture to room temperature. In one example room temperature is between 15 deg. C. to 35 deg. C. Step 544 comprises sequentially adding acrylamide monomers, $K_2S_2O_8$ and N,N'-methylenebisacrylamide into the cooled solution. In this example 5 g of acrylamide monomers, 25 mg $K_2S_2O_8$ and 3 mg N,N'-methylenebisacrylamide were added. Step 545 comprises stirring the mixture for a further 1 hour. Step 546 comprises injecting the mixture into glass moulds. Step 547 comprises heating the moulds including the mixture in an oven for a predetermined time at a predetermined temperature. In step 547 the moulds including the mixture are heated in an oven for 1 hour at 75° C. The oven heating functions as a curing. Following step 547 the hydrogel film is yielded. Step 548 comprises immersing the fabricated hydrogel film in a M aqueous $ZnSO_4$ solution for 1 hour to achieve the equilibrated state. Step 506 of synthesizing the electrolyte comprises the method 540 and all the steps of method 540.

Figure 5E:
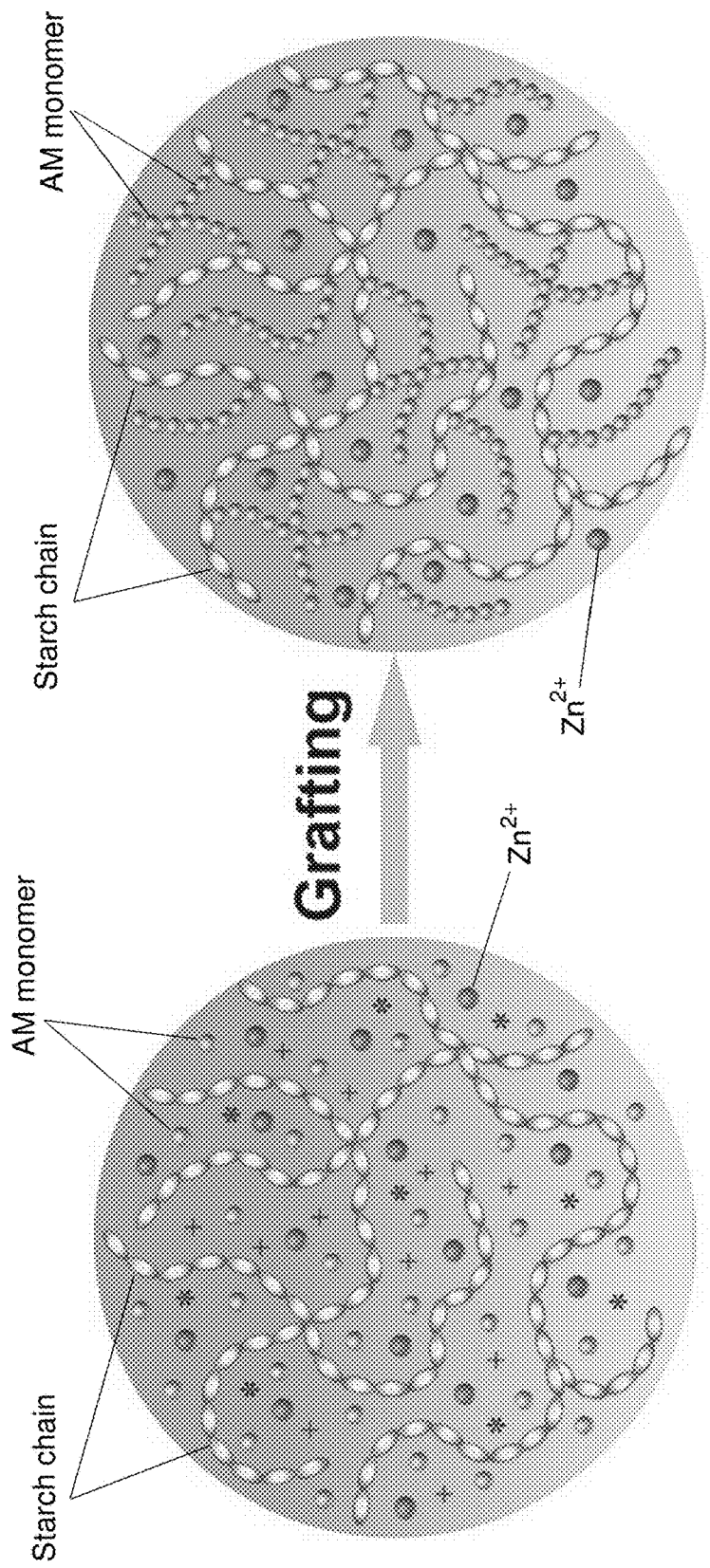
FIG. 5e shows a structure of the electrolyte.

FIG. 5e shows the structure of the electrolyte 130. The electrolyte is synthesized by grafting superabsorbent polyacrylamide onto starch chains by solution polymerisation. The method 540 comprises solution polymerisation. As can be seen in FIG. 5e after the solution polymerisation process the polyacrylamide chains are grafted onto the starch, thereby providing an electrolyte with high ionic conductivity e.g. $2.65 \times 10^{-2}$ S cm$^{-1}$. The electrolyte 130 also comprises a porous architecture that contributes to high water retention capability and fast ion diffusion. The electrolyte 130 serves as a separator and electrolyte.

As described above the method 500 comprises all the steps of sub methods 520, 530 and 540, as part of the overall method 500 of fabricating the battery 500. The methods 520, 530 and 540 may be performed sequentially or may be performed concurrently.

The battery 100 as described herein provides an efficient rechargeable battery. The cathode comprising molybdenum disulphide ($MoS_2$) provides a versatile electrode material for energy storage and conversion. The battery 100 comprising an electrode (i.e. cathode) formed from $MoS_2$ provides a high performance battery. The battery 100 has a specific capacity of 202.6 mA h g$^{-1}$ at 0.1 A g$^{-1}$, a substantially large energy density of about 148.2 Wh kg$^{-1}$ and good cycle stability with a capacity retention ratio of at least 98%, and in one example 98.6% over 600 cycles.

Electrochemical performance of a battery 100 was performed. The battery comprising a zinc anode and a carbon cloth+molybdenum disulphide cathode was tested. FIG. 6a is a plot 600 that shows galvanostactic charge/discharge curves of the battery 100 at various current densities. FIG. 6b shows rate performance i.e. rate capability graph 610 of the battery 100. As seen from FIGS. 6a and 6b, specific discharge capacities of 202.6, 184.1, 164.5, 148.3, 128.7 and 104.5 mA h g$^{-1}$ are achieved at 0.1, 0.5, 1.0, 2.0, 3.0 and 4.0 A g$^{-1}$, respectively. It was found that when the test current density is reduced back to 0.1 Ag$^{-1}$, a high discharge capacity of 197.8 mA h g$^{-1}$ could be well recovered with a recovery ratio of approximately 97% (in this example 97.6%). This demonstrates good electrochemical reversibility and fast reaction kinetics.

Figure 6C:
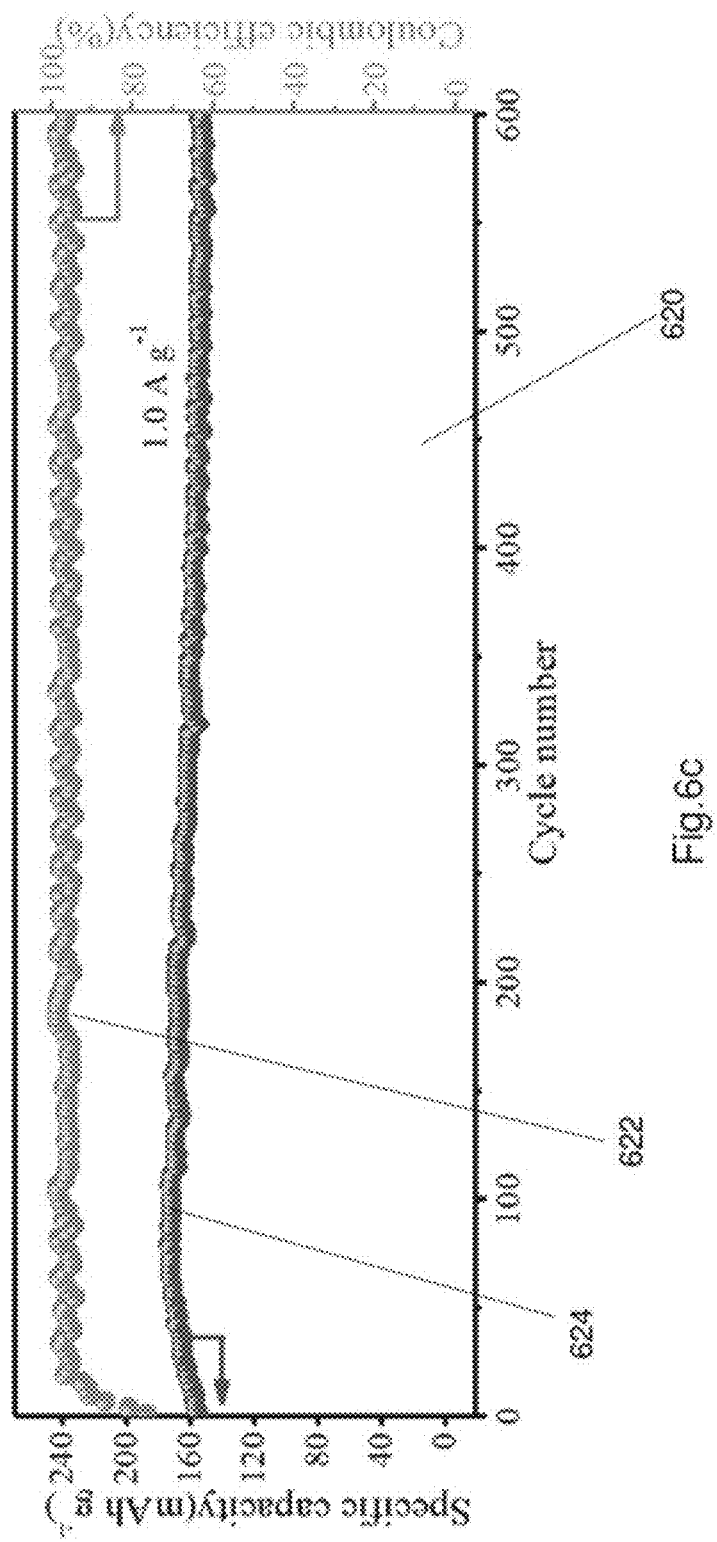
FIG. 6c shows a plot illustrating cyclic stability and cyclic performance of the rechargeable electrical device of FIG. 1, at $1.0 \text{ A g}^{-1}$.

FIG. 6c shows a plot 620 illustrating cyclic stability and cyclic performance of the battery 100, at 1.0 A g-1. The specific capacity increases gradually in the initial 100 cycles and then shows a slight degradation. Curve 622 illustrates coulombic efficiency of the battery 100 after 600 cycles. Curve 624 shows the specific discharge capacity after 600 cycles. As seen from curve 622, after 600 cycles 98.6% of the initial discharge capacity was achieved, demonstrating good cycling stability. As shown from curve 624 a specific capacity of 162.197 mA h g-1 was achieved after 600 cycles. The expanded interlayer structures i.e. the larger inter-layer spacing provides improved electrochemical kinetics with easier diffusion of zinc ions.

Figure 6E:
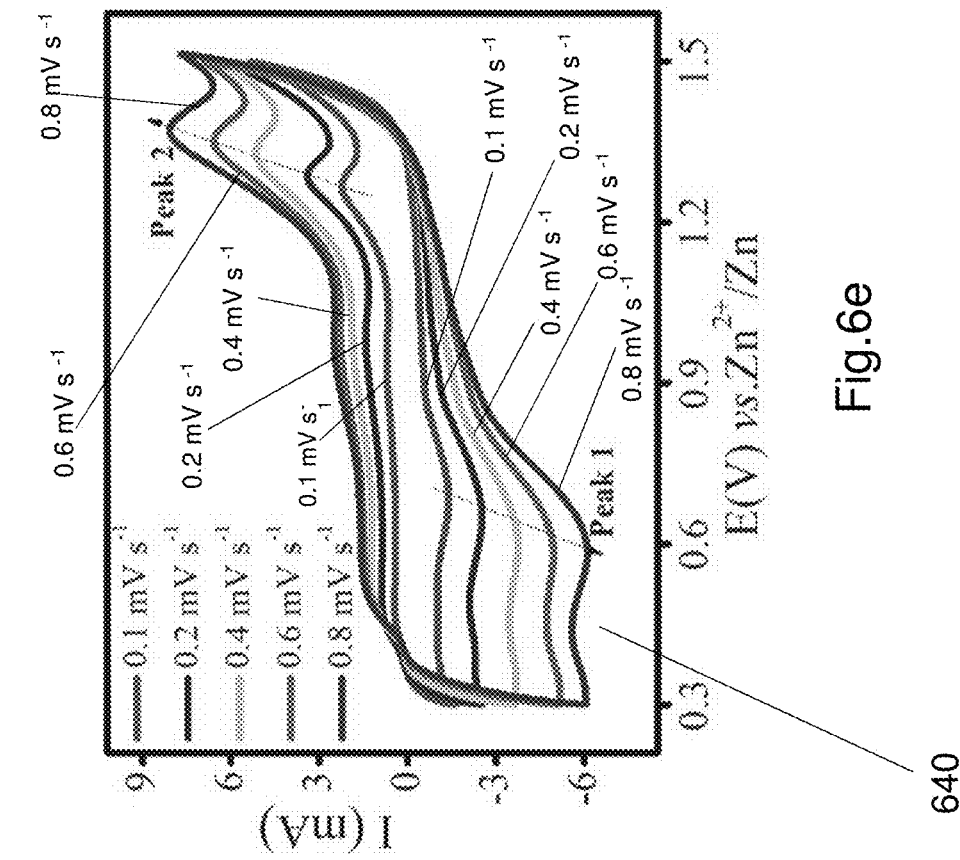
FIG. 6e shows a plot illustrating CV profiles of the cathode of the electrical device of FIG. 1.
Figure 6D:
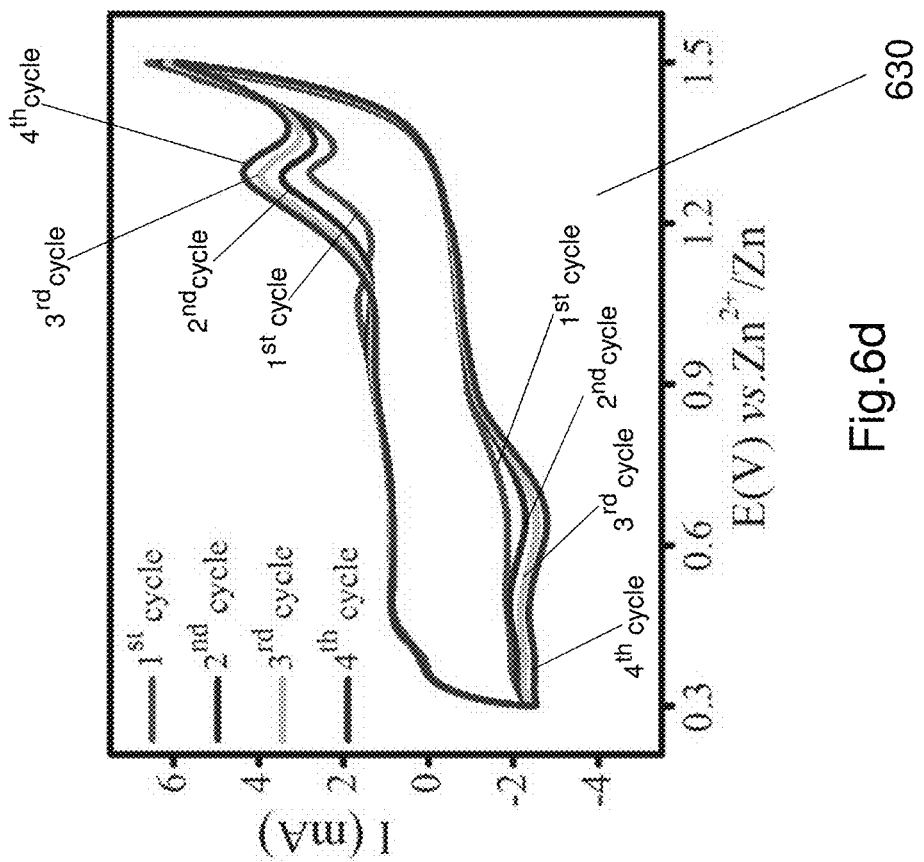
FIG. 6d shows a plot illustrating a plurality of CV profiles of the cathode of the electrical device of FIG. 1.

The electrochemical properties of the cathode 120 of the battery 100 were evaluated by cyclic voltammogram (CV) at a scan rate of 0.2 mV s$^{-1}$. FIG. 6d shows a plot 630 illustrating a plurality of CV profiles. The plot 630 shows four cycles being tested. Plot 630 shows a pair of reduction/oxidation peaks located at 0.64V and 1.28V, which are in accordance with discharge and charge plateaus. Similar well resolved peaks were observed at successive scans, which are effectively enlarged than the first cycles. The gradually stabilized structural mechanics and periodic activation of the $MoS_2$ cathode during initial charge/discharge processes contribute to the increased currents in subsequent cycles after the first cycle. FIG. 6e shows a plot 640 illustrating CV profiles of the cathode of the battery 100. The CV measurements were performed at various scan rates in the range from 0.1 to 0.8 mV s$^{-1}$. As seen in FIG. 6e the scan values were 0.1, 0.2, 0.4, 0.6 and 0.8 mV s$^{-1}$.

Figure 6F:
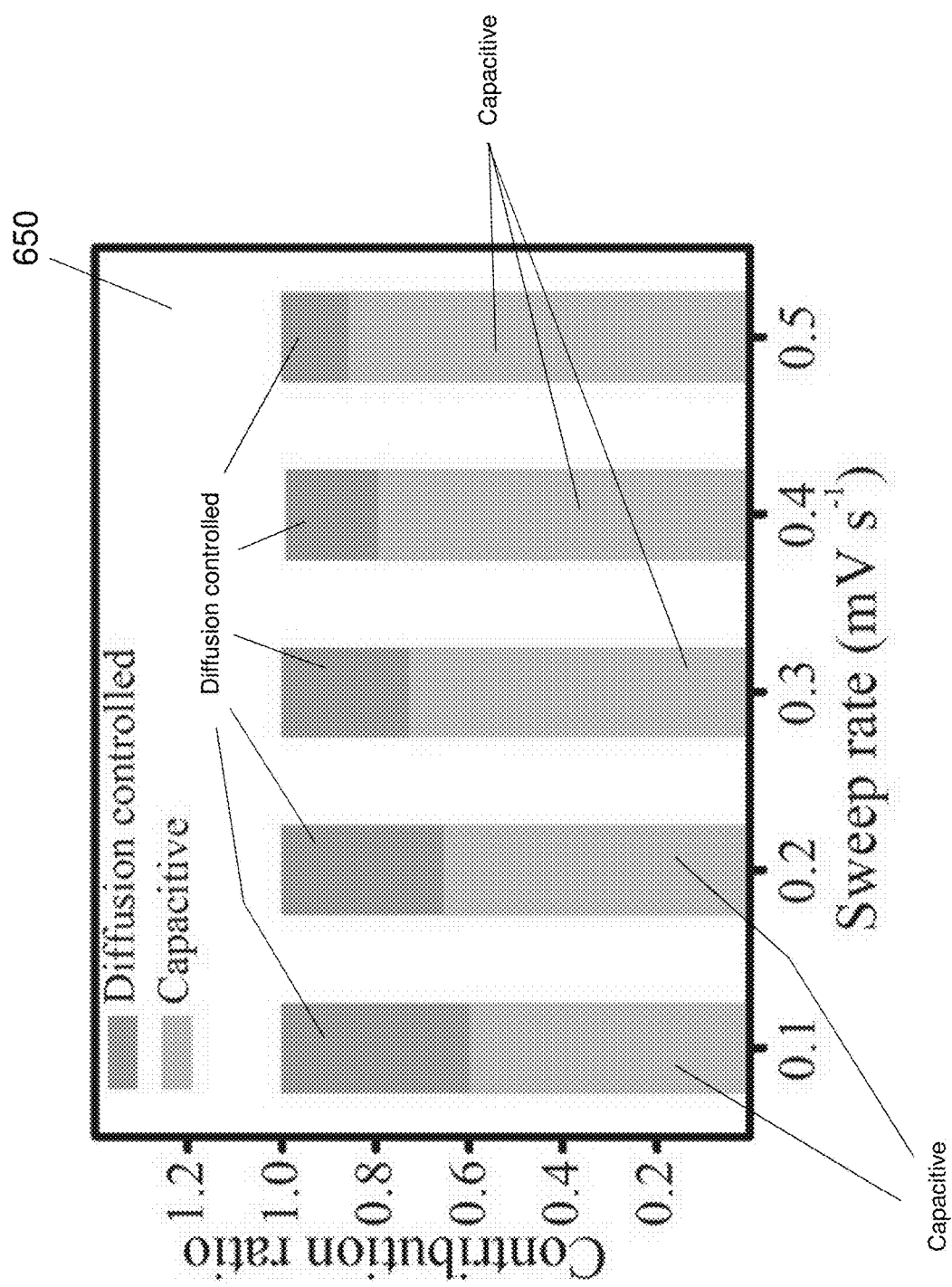
FIG. 6f shows a plot that illustrates the various capacitive and diffusion-controlled capacity values at different rates for the electrical device of FIG. 1.

Based on these test results the electrochemical process of the cathode is mainly influenced by surface controlled capacitive process. FIG. 6f shows a plot 650 that illustrates the various capacitive and diffusion-controlled capacity values at different rates. The plot 650 shows the contribution ratio at various scan sweep rates. At the scan rate of 0.1 mV s$^1$, nearly 61.3% of the total current is capacitive limited. The contribution ratio of the capacitive process increases steadily with the increscent scan rates and the capacitive process plays a leading role in the total capacity due to the diffusion limited process being much slower than the surface capacitive effects.

The battery 100 as described herein is substantially flexible such that it can be deformed and still maintain its electrochemical performance. For example, the battery 100 can undergo bending, twisting, stretching or compression while still substantially maintaining its electrochemical performance and electrical properties. FIG. 7 shows a photo of the battery 100 (i.e. rechargeable electrical device 100) that is wrapped around a stainless steel bar 700. The flexible nature of the battery 100, the fast charging/discharging can be used in a wide variety of applications for large scale energy storage and portable or flexible electronic devices. FIGS. 8a and 8b illustrate a flexible electroluminescent panel 800 that is powered by three batteries having a construction as battery 100. The batteries are incorporated into the panel 800. FIG. 8a shows the flexible panel 800 (and batteries) in a normal configuration. FIG. 8b shows the panel 800 (and batteries) in a bent configuration. As can be seen from FIG. 8b the operation of the panel 800 is not affected due to being bent.

Other applications of the battery 100 described herein are for wearable so devices, digital memory, sensors, active radio frequency identification tags, implantable medical devices (as power sources) and smart clothing. The materials are substantially biocompatible and the use of carbon cloth in the battery allows the battery to be woven into smart clothing. Additionally, the battery 100 as described herein can be used in other fields such as transportation, robotics, military applications, sport, medical diagnostics and large scale energy storage.

The rechargeable electrical device 100 as described herein is advantageous because it includes an electrode (i.e. cathode) that comprises $MoS_2$ (molybdenum disulphide). The use of $MoS_2$ improves the speed and/or efficiency of charging and discharging. This is because use of $MoS_2$ reduces ion diffusion resistance due to the increased interlayer spacing (e.g. interlayer spacing of 0.7 nm), which leads to faster reaction kinetics and a low energy barrier for Zn ion intercalation. Further the use of $MoS_2$ improves interfacial contact between the electrolyte and the cathode, and shortens the Zn ion diffusion pathways, thereby improving charging and discharging.

Further the rechargeable electrical device 100 (i.e. battery 100) described herein is advantageous because the battery 100 can be manufactured facially in open atmosphere. The battery does not need specific water and oxygen free environments or any other protection measures. This simplifies manufacturing and allows the manufacturing process to be scaled up relatively easily as compared to manufacturing processes that require several protection measures (e.g. oxygen free environments). The manufacturing process is also cheaper and more economical.

The battery 100 further uses non-toxic, non-corrosive electrodes and electrolytes. $MoS_2$ is a non-toxic and non-corrosive material which makes the battery inherently safer to use and also expands the applications of the battery 100. The battery 100 as described herein is also low cost, safe and environmentally friendly improving and increasing application of the electrical device 100.

The rechargeable electrical device 100 comprises a flexible construction thereby making the device 100 suitable for use as a power source in wearable devices or flexible electronic applications. The rechargeable device 100 is flexible and retains its electrochemical performance even when subjected to large mechanical deformations such as for example twisting, bending, stretching or compression. The flexibility is attributed to the specific substrate materials, the hydrogel electrolyte and the use of a stable cathode material such as $MoS_2$. The flexible nature of the electrical device 100 makes the device 100 suited for use in flexible devices or wearable devices. Similarly, the device is also suited for use as a large scale power supply.

The embodiments of the battery described herein comprise a zinc anode, i.e. the anode comprises zinc anode. In alternative embodiments the battery 100 may comprise an anode that includes a zinc alloy or zinc composites rather than zinc metal.

In alternative embodiments the anode may comprise metals or metal compounds or metal alloys of metals other than zinc to define the metal layer 114. In an alternative embodiment the anode may comprise magnesium or a magnesium alloy or magnesium compound that forms the metal layer. In an alternative embodiment the anode may comprise sodium or a sodium compound or a sodium alloy that forms the metal layer of the anode. In a further alternative embodiment, the anode may comprise aluminium or aluminium alloy or an aluminium compound. These alternative metals may be in the form of a power, film or foil that is disposed on the anode substrate.

The described embodiments of the battery also define a carbon cloth as an anode substrate. In an alternative embodiment the anode substrate may comprise a nickel-copper alloy sheet. The nickel-copper alloy sheet is a flexible sheet upon which the metal layer of the anode is disposed (e.g. zinc). The nickel-copper alloy sheet functions as an anode substrate and a current collector as it is a conductive element.

The description herein is directed to the rechargeable electrical device being a battery. The structure of the battery as described herein can be applied to other electrical energy storage and supply devices such as for example capacitors or super capacitors. In an alternative embodiment a capacitor may comprise the same structure as battery 100 as described herein, but function as a capacitor to store and discharge electrical energy. The use of molybdenum disulphide is advantageous due to the improved charge and discharge times achieved due to the increased interlayer spacing that reduces ion diffusion resistance.

The description of any of these alternative embodiments is considered exemplary. Any of the alternative embodiments and features in the alternative embodiments can be used in combination with each other or with the embodiments described with respect to the figures.

The various graphs and plots described herein were derived from testing performed by the inventor or a third party engaged by the inventor to illustrate the effectiveness of the battery described herein. The graphs and plots are the test results of a battery that includes a cathode comprising molybdenum disulphide. Some graphs also include comparative tests between the battery 100 including a cathode comprising molybdenum disulphide and another commonly used zinc-ion battery.

The foregoing describes only a preferred embodiment of the present invention and modifications, obvious to those skilled in the art, can be made thereto without departing from the scope of the present invention. While the invention has been described with reference to a number of preferred embodiments it should be appreciated that the invention can be embodied in many other forms.

The invention claimed is:

1. A rechargeable electrical device comprising:
   an anode comprising zinc, a zinc alloy, or a zinc composite,
   a cathode comprising:
      a flexible carbon cloth with a plurality of carbon fibers, and
      a multi-layered structure of molybdenum disulphide ($MoS_2$) comprising a plurality of $MoS_2$ sheets vertically arranged on the carbon fibers, the multi-layered structure configured for ion intercalation, an electrolyte located between the anode and the cathode, and a housing retaining the anode, cathode, and electrode.

2. The rechargeable electrical device in accordance with claim 1, wherein the anode comprises an anode substrate and a zinc foil wherein the zinc foil is disposed on the anode substrate.

3. The rechargeable electrical device in accordance with claim 2, wherein the anode substrate comprises a carbon cloth.

4. The rechargeable electrical device in accordance with claim 1, wherein interlayer spacing between adjacent layers of the plurality of $MoS_2$ sheets is between 0.4 nm to 1 nm.

5. The rechargeable electrical device in accordance with claim 4, wherein the interlayer spacing is around 0.7 nm.

6. The rechargeable electrical device in accordance with claim 1, wherein the electrolyte comprises a hydrogel.

7. The rechargeable electrical device in accordance with claim 6, wherein the hydrogel comprises starch and polyacrylamide.

8. The rechargeable electrical device in accordance with claim 1, wherein the rechargeable electrical device is a battery.

9. A rechargeable battery comprising:

an anode, a cathode spaced apart from the anode, the cathode comprising:
- a flexible carbon cloth with a plurality of carbon fibers, and
- a multi-layered structure of molybdenum disulphide ($MoS_2$) comprising a plurality of $MoS_2$ sheets vertically arranged on the carbon fibers, the multi-layered structure configured for ion intercalation, wherein spaces between adjacent $MoS_2$ sheets provide spaces for the intercalation of zinc ions, and wherein the cathode is configured to reversibly store and release zinc ions during charging and discharging, respectively, an electrolyte disposed between the anode and the cathode, wherein the electrolyte comprises a hydrogel or a gel polymer, and wherein the electrolyte also functions as a separator.

10. The rechargeable battery in accordance with claim 9, wherein interlayer spacing between adjacent sheets of molybdenum disulphide is between 0.6 nm and 0.8 nm.

11. The rechargeable battery in accordance with claim 10, wherein the anode comprises zinc metal or a zinc alloy and the electrolyte includes starch and polyacrylamide.

12. The rechargeable battery in accordance with claim 11, wherein the anode comprises a substrate, the substrate comprises a carbon cloth, and a zinc film disposed on the carbon cloth.

13. The rechargeable battery in accordance with claim 9, wherein the electrical device comprises a current collector disposed on the cathode and a current collector disposed on the anode, each current collector comprising a plate disposed on the anode and cathode respectively.

14. A method fabricating a rechargeable electrical device, the method comprising the steps of:

synthesizing an anode that comprises zinc, a zinc alloy, or a zinc composite, synthesizing a cathode that comprises a flexible carbon cloth with a plurality of carbon fibers, and a multi-layered structure of molybdenum disulphide ($MoS_2$) comprising a plurality of molybdenum disulphide sheets vertically arranged on the carbon fibers, the multi-layered structure is configured for ion intercalation, forming a hydrogel or polymer gel electrolyte, locating the electrolyte between the anode and the cathode, and retaining the anode, cathode and electrolyte within a housing.

15. The method fabricating a rechargeable electrical device in accordance with claim 14, wherein the step of synthesizing the anode comprises the steps of:

providing a pre-treated carbon cloth as an anode substrate, electrodepositing a zinc foil on the carbon cloth.

16. The method fabricating a rechargeable electrical device in accordance with claim 14, wherein the step of synthesizing the cathode comprises the steps of:

providing a carbon cloth, immersing the carbon cloth into nitric acid, washing the carbon cloth, dissolving $Na_2MoO_4$ and $CS(NH_2)_2$ and glucose to create a solution, adding hydrochloric acid to the solution, immersing the carbon cloth into the solution, stirring the carbon cloth and solution for a predetermined time, autoclaving the solution and the carbon cloth at a predetermined temperature for a predetermined time.

17. The method fabricating a rechargeable electrical device in accordance with claim 14, wherein the step of synthesizing the electrolyte comprises the steps of:

mixing starch and deionised water, stir the starch and water mixture at a predetermined temperature above room temperature for a predetermined time, cooling the stirred mixture to room temperature, sequentially adding electrolyte monomers to the stirred mixture, stir the mixture with the electrolyte monomers for an additional predetermined time, injecting the stirred mixture into moulds, heating the moulds at a predetermined temperature for a predefined time period to create a hydrogel, immersing the hydrogel into a M aqueous $ZnSO_4$ solution.

18. The method fabricating a rechargeable electrical device in accordance with claim 17, wherein the electrolyte monomers comprise acrylamide monomers, $K_2S_2O_8$ and N,N'-methylenebisacrylamide.

\* \* \* \* \*